US008776952B2

(12) United States Patent  
Schwarz et al.

(10) Patent No.: US 8,776,952 B2  
(45) Date of Patent: Jul. 15, 2014

(54) THERMAL MANAGEMENT SYSTEM FOR TURBOFAN ENGINES

(75) Inventors: Frederick M. Schwarz, Glastonbury, CT (US); Mikhail B. Gorbounov, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1168 days.

(21) Appl. No.: 11/432,111

(22) Filed: May 11, 2006

(65) Prior Publication Data

US 2007/0264133 A1 Nov. 15, 2007

(51) Int. Cl.
*F02C 7/14* (2006.01)
*F28D 11/00* (2006.01)
*F28F 27/00* (2006.01)

(52) U.S. Cl.
USPC ........... 184/104.1; 184/6.22; 165/86; 165/96; 60/39.08; 60/226.1; 60/267

(58) Field of Classification Search
USPC .................. 165/125, 86, 96; 60/39.01, 39.08, 60/226.1, 267; 184/6.22, 104.1, 6.11; 417/110; 244/57
See application file for complete search history.

(56) References Cited

U.S. PATENT DOCUMENTS

| | | | | |
|---|---|---|---|---|
| 2,162,148 A * | 6/1939 | Wilson et al. | ...................... | 303/1 |
| 2,249,948 A * | 7/1941 | Claude | ............................ | 244/57 |
| 2,291,607 A * | 8/1942 | Chausson | ....................... | 236/35 |
| 2,865,580 A | 12/1958 | Marshall | | |
| 2,979,293 A * | 4/1961 | Mount | ...................... | 244/117 A |
| 3,080,716 A * | 3/1963 | Cummings et al. | ............. | 60/736 |
| 3,300,965 A * | 1/1967 | Sherlaw et al. | ............... | 60/39.08 |
| 3,563,307 A * | 2/1971 | Pain et al. | ........................ | 165/86 |
| 3,804,353 A * | 4/1974 | Scott et al. | ....................... | 244/57 |
| 4,020,632 A * | 5/1977 | Coffinberry et al. | ............ | 60/773 |
| 4,068,469 A * | 1/1978 | Adamson | ......................... | 60/204 |
| 4,151,710 A * | 5/1979 | Griffin et al. | ................. | 60/39.08 |
| 4,254,618 A * | 3/1981 | Elovic | ........................... | 60/226.1 |
| 4,354,345 A * | 10/1982 | Dreisbach et al. | ............. | 60/39.08 |
| 4,546,605 A * | 10/1985 | Mortimer et al. | ............. | 60/226.1 |
| 4,696,156 A * | 9/1987 | Burr et al. | ..................... | 60/39.08 |

(Continued)

FOREIGN PATENT DOCUMENTS

GB 2204361 A 11/1988
WO W09211451 A1 7/1992

OTHER PUBLICATIONS

European Search Report, mailed Jan. 26, 2011.

*Primary Examiner* — David D Le
*Assistant Examiner* — Terry Chau
(74) *Attorney, Agent, or Firm* — Kinney & Lange, P.A.

(57) ABSTRACT

A heat exchange system for use in operating equipment in which a working fluid is utilized needing a heat exchange system to provide air and working fluid heat exchanges to cool the working fluid at selectively variable rates in airstreams. The system comprises a plurality of heat exchangers including a first heat exchanger in the plurality of heat exchangers that is mounted with respect to the equipment so as to permit corresponding portions of the airstreams to pass through the core thereof during at least some such uses of the equipment. Also, a second heat exchanger is mounted with respect to the equipment so as to selectively permit corresponding portions of the airstreams to pass through the core thereof during such uses of the equipment. A core actuator is mounted with respect to the second heat exchanger to selectively increase or reduce the passing of those corresponding portions of the airstreams through the core.

13 Claims, 7 Drawing Sheets

(56) References Cited

U.S. PATENT DOCUMENTS

| | | | |
|---|---|---|---|
| 4,914,904 A * | 4/1990 | Parnes et al. | 60/226.1 |
| 5,088,280 A * | 2/1992 | Scott-Scott et al. | 60/257 |
| 5,121,598 A * | 6/1992 | Butler | 60/39.08 |
| 5,177,951 A | 1/1993 | Butler | |
| 5,269,135 A * | 12/1993 | Vermejan et al. | 60/226.1 |
| 5,438,823 A * | 8/1995 | Loxley et al. | 60/39.08 |
| 5,615,547 A * | 4/1997 | Beutin et al. | 60/39.08 |
| 6,000,210 A * | 12/1999 | Negulescu | 60/772 |
| 6,584,778 B1 * | 7/2003 | Griffiths et al. | 60/782 |
| 6,931,834 B2 * | 8/2005 | Jones | 60/226.1 |
| 7,377,100 B2 * | 5/2008 | Bruno et al. | 60/267 |
| 7,454,894 B2 * | 11/2008 | Larkin et al. | 60/226.1 |
| 8,490,382 B2 * | 7/2013 | Zysman et al. | 60/226.3 |
| 2007/0215326 A1 * | 9/2007 | Schwarz et al. | 165/96 |
| 2008/0028763 A1 * | 2/2008 | Schwarz et al. | 60/771 |

* cited by examiner

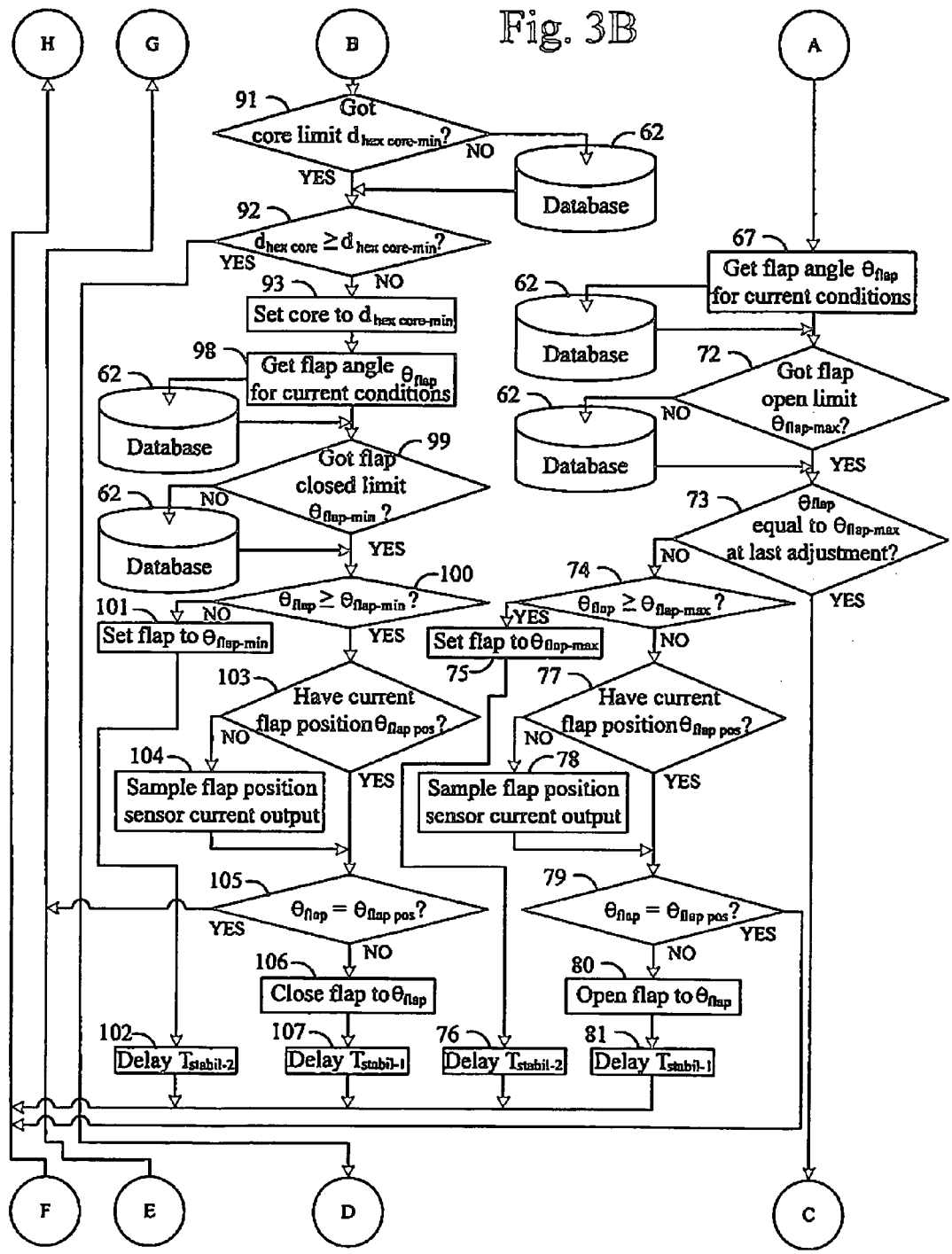

THERMAL MANAGEMENT SYSTEM FOR TURBOFAN ENGINES

BACKGROUND OF THE INVENTION

The present invention relates to lubrication systems for turbine engines and for associated equipment, and more particularly, to air and lubricant heat exchangers for use in maintaining desired temperatures of the lubricants in such engines and equipment.

Lubrication systems for turbine engines, such as a turbofan engine, and for associated equipment, such as an integrated drive generator, provide pressurized lubricant, an oil, to lubricate, cool and clean the engine main bearings, gear box gears, and the like, and again for the lubrication of bearings and other parts in equipment associated with such turbine engines. During such lubrications, heating of the lubricant is caused to occur due to mechanical energy losses in the lubricated apparatus. Thermal management of such lubricants is very important for continued successful operation of such lubrication systems in the apparatus lubricated thereby.

The amount of heat necessary to be ejected from lubricants in such systems is increasing because of the use of larger electrical generators, for instance, in aircraft turbine engines due to increasing consumption of electrical power in the aircraft powered thereby, and because of the advances in aircraft turbine engines such as the use of geared turbofans for such aircraft with large fan-drive gearboxes. Despite the added heat generated by the such modified and expanded equipment, the necessary lubricating oil operating temperature ranges to provide satisfactory lubricating performance have not changed for the most part and, in some instances, the upper operating temperature limits have been reduced.

The lubrication system for a turbofan engine in an aircraft typically has a first heat exchanger providing lubricating oil passing through passageways in that heat exchanger that is cooled by the fuel stream flowing past these passageways. This arrangement permits the lubricating oil to reject heat therein to the fuel in the aircraft thereby heating that fuel to help recover some of the energy lost in the combustor of the engine. Because in some flight situations more heat is generated in the lubricating oil than is needed for warming the fuel, a portion of the lubricating oil can be forced to bypass the heat exchanger for the fuel and the lubricating oil, and the oil can be directed to a further heat exchanger where the heat therein is transferred to the air in the secondary airstream provided by the fan of the turbofan engine. In a typical arrangement, a duct is provided in the fan cowling through which a portion of the airstream is diverted, and the air and lubricating oil heat exchanger is placed in this duct so that the lubricating oil passing through passageways in that heat exchanger is cooled by the duct airstream flowing past these passageways in the exchanger. If such additional cooling of the oil is not needed in a flight situation, the lubricating oil can again be forced to bypass this air and lubricating oil heat exchanger.

However, the fan airstream that is diverted to pass through the lubricating oil and air heat exchanger in such duct systems must always flow at least in part through that exchanger, perhaps regulated by some air valve or stream limiting door, and the exchanger must be large enough, insofar as assuring that a sufficient part of the cooling engine fan airstream flows over a sufficient amount of lubricating oil flowing in passageways therein, to provide adequate oil cooling for the most extreme flight conditions encountered. This is true even though this heat exchanger size is not needed for many, or even most, of these flight conditions. Such a larger sized exchanger correspondingly requires larger fairings about that exchanger leading to a) possible detachment of the fan streams therefrom and the resulting vortex losses absent further preventive measures, b) a larger inlet to the duct possibly resulting in the "spilling" out of incoming air and the accompanying eddy and mixing losses, and to c) a larger range of required motion for the required larger size duct outlet flaps possibly leading to this flap interfering more with the fan airstream passing the outside of the flap when in the range of being nearly fully open to being fully open. These three consequences, even in an optimally configured arrangement will result in losses. Thus, such an air and lubricating oil heat exchanger duct based system continually leads to thrust losses in the turbofan engine despite being unnecessary for cooling the lubricating oil in many flight. situations. Hence, there is a strong desire for a lubricating oil thermal management system to control fuel and oil temperatures that also reduces such thrust losses and additionally reduces the volume required therefor in the more compact available spaces in advanced turbofan engines.

BRIEF SUMMARY OF THE INVENTION

The present invention provides a heat exchange system for use in operating equipment in which a working fluid is utilized in providing selected operations thereof with the heat exchange system providing air and working fluid heat exchanges to cool the working fluid at selectively variable rates in airstream is occurring with uses of that equipment. The system comprises a plurality of heat exchangers each having a core with a plurality of passageway structures therein about which air can flow with the passageway structures being connected to an input conduit at one end thereof and connected to an output conduit at an opposite end thereof to enable providing the working fluid to, and removal from, interiors of the passageway structures through interiors of the input and output conduits. There is a first heat exchanger in the plurality of heat exchangers that is mounted with respect to the equipment so as to permit corresponding portions of the airstreams to pass through the core thereof during at least some such uses of the equipment. Also, a second heat exchanger in the plurality of heat exchangers is mounted with respect to the equipment so as to selectively permit corresponding portions of the airstreams to pass through the core thereof during such uses of the equipment. A core actuator is mounted with respect to the second heat exchanger to selectively increase or reduce the passing of those corresponding portions of the airstreams through the core thereof during such uses of the equipment.

BRIEF DESCRIPTION OF THE DRAWINGS

FIGS. 3A, 3B and 3C show schematic flow charts representing operations undertaken in the system of FIG. 2.

DETAILED DESCRIPTION

Because of the foregoing limitations of the use of a single heat exchanger providing air cooling of the lubricating oil in a turbofan engine lubrication system, a more optimal lubrication system configuration for air cooling of the lubricating oil comprises splitting the single heat exchanger typically used in such a system for air cooling of the lubricating oil into two such heat exchangers each usually of a size differing from that of the other. These two heat exchangers are then specialized to have one optimized for the regularly encountered range of cooling loads and the other for aiding the first exchanger on those occasions when relatively extreme cooling load conditions are encountered. This allows for smaller sizes and more effective operational arrangements to be selected for each heat exchanger, and generally enables more fuel efficient operation of the oil cooling system. Such a lubrication system is more optimal with respect to system weight, system volume and fuel consumption.

Such a two air cooling heat exchanger engine lubrication system is attractive for the new engines and aircraft being developed having extraordinarily high heat rejection challenges in being more effective in face of the corresponding extraordinarily wide variation in heat loads and engine fuel heat sink capacities. One of the two heat exchangers for air cooling of the lubricating oil can be a smaller thrust producing heat exchanger providing small drag and large thrust recovery for regularly encountered cooling loads and so can have an optimal heat exchanger duct inlet, with relatively slender fairings around the heat exchanger and with a relatively small duct exit size and size range if the exit area is variable. The other heat exchanger can provide large drag and large cooling rates when needed for extreme cooling load conditions but can also be removed as a source of drag when not needed for additional cooling by removing it from, or smoothly shielding it from, the fan stream of the turbofan engine.

Figure 1A:
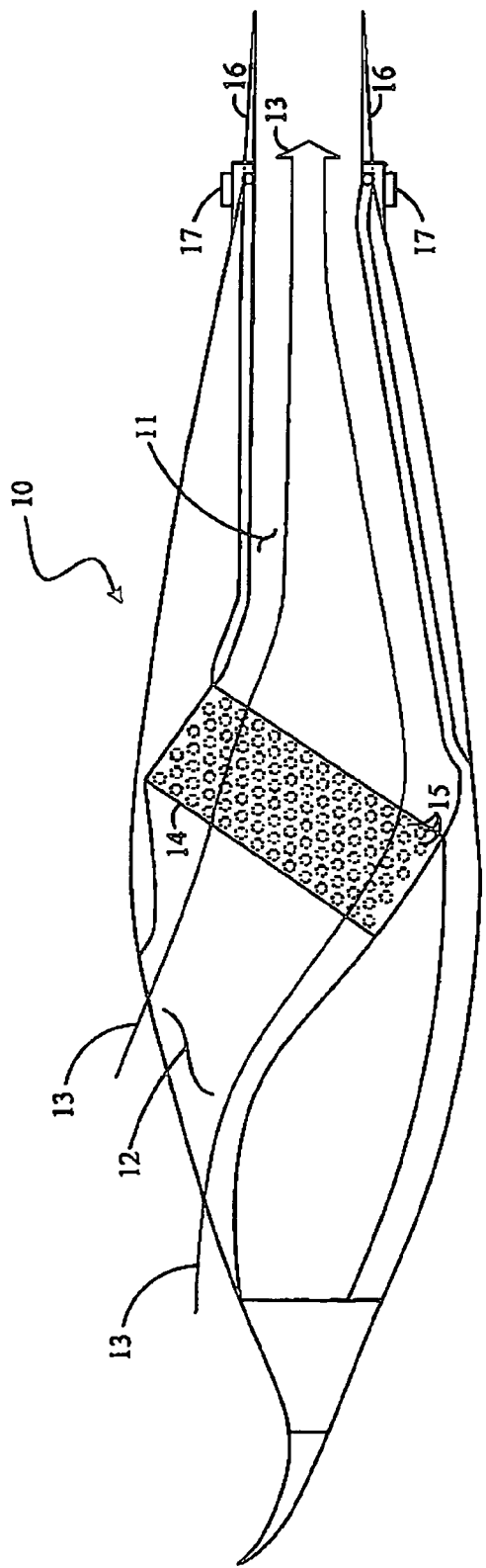
FIGS. 1A, 1B and 1C show components of the present invention mounted in equipment typical of that used therewith.
Figure 1B:
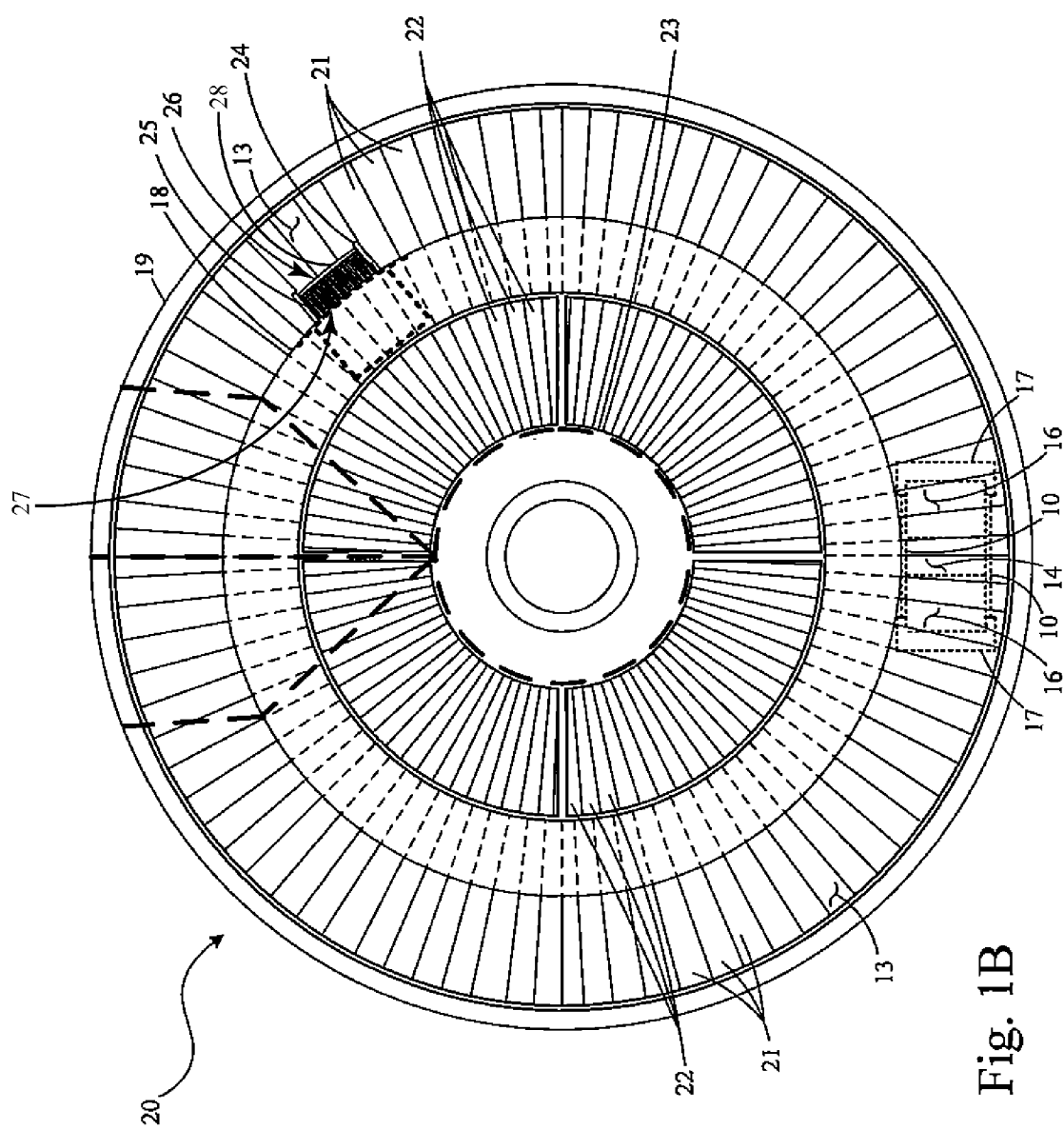
Figure 1C:
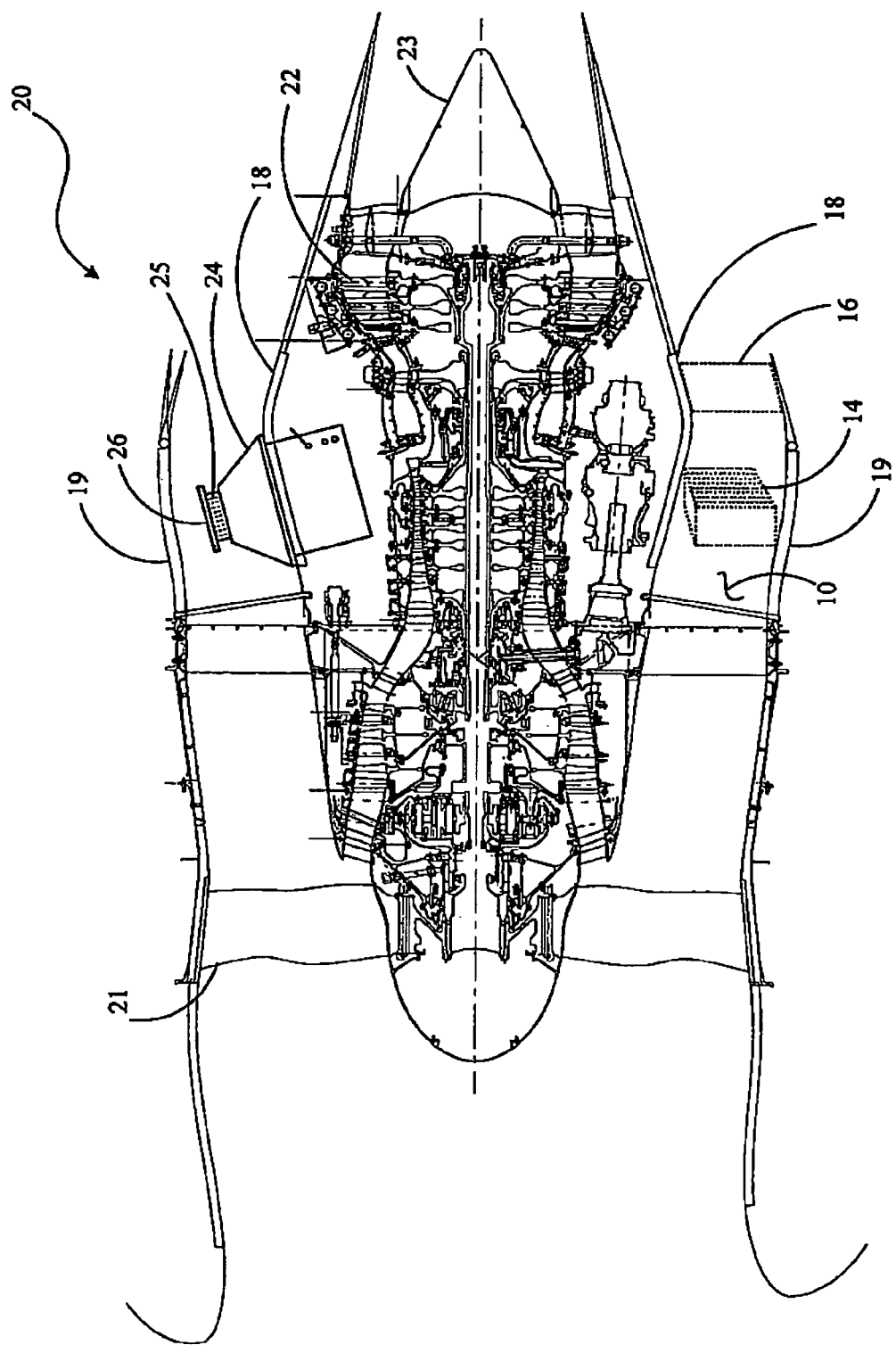

One possible alternative for providing the small drag and large thrust recovery heat exchanger for typically encountered cooling conditions is shown in FIG. 1A, and a possible alternative for providing the large drag, i.e. the pressure drop deliberately incurred for the purpose of promoting large heat transfers, and the large cooling rates heat exchanger for more extreme cooling conditions, along also with the heat exchanger from FIG. 1A, is shown in FIG. 1B. In FIG. 1A there is shown a top view of a fan duct lower bifurcation structure, 10, having an airstream duct, 11, beginning at a duct inlet, 12, and extending from there in this structure over a portion of its length. An airstream, 13, from a portion of the turbofan engine fan airstream, or fan stream, enters duct 11 at inlet 12 to pass through a heat exchanger, 14, that uses airstream 13 to cool lubricating oil in the engine lubrication system forced under pressure through a plurality of oil carrying tubes, 15, that are suitably connected into the lubrication system so as to allow oil therein to flow through these tubes. Airstream 13 flows about, and then past, those tubes to reach the exit of duct 11 which has an exit cross sectional area that is controlled in magnitude by a pair of exit flaps, 16, which can be selectively rotated forcibly inward from the positions thereof shown in FIG. 1A by angle positioning motors combined with angle sensors, 17, about pins or through use of shafts coupled to those motors. Bifurcation structure 10 is positioned between the bottom of the wall of an engine nacelle, 18, and the bottom of the wall of an outer fairing, 19, of the engine pod for a turbofan engine, 20, as indicated in FIGS. 1B and 1C.

Because of the smaller size permitted for heat exchanger 14 in not having to be sufficiently large to provide sufficient cooling alone of the engine lubricating oil in all conditions, duct inlet 12 in turn need not be so large as to result in part of the fan stream partially entering the duct but then "spilling" back out of the duct to reenter the fan stream thereby causing turbulence and thrust losses in that fan stream. Similarly, the width of bifurcation structure 10 more or less perpendicular to the fan stream to accommodate internally heat exchanger 14 can be less to thereby reduce drag and keep the wall angles thereof with respect to the fan stream direction sufficiently small to avoid the very undesirable detachment of the stream from that wall.

This smaller bifurcation width also allows exit flaps 16, in reducing the duct exit area to increase thrust due to airstream 13, to be more or less forced all the way together by motor/sensors 17 at the outer ends thereof to reduce the cooling rate, when conditions require only relatively smaller flows in airstream 13 to provide sufficient oil cooling, while again keeping the flap wall angles with respect to the fan stream direction sufficiently small to avoid detachment of the fan stream from those walls. Thus, this bringing together of the flap outer ends without too great an angle between the flap walls and the direction of the fan stream can be accomplished without having to introduce a center wall with its accompanying weight and drag between the outer ends of flaps 16 at the exit of duct 11 as a basis for limiting their inward angle reached in more or less closing off the duct exit area in increasing the thrust due to airstream 13.

In FIG. 1B there is shown a cut away rear view of turbofan engine 20 with outer fairing 19 about an engine fan, 21, providing fan airstream 13 along the wall of engine nacelle 18, or the inner fan duct wall. That is, fan airstream 13 flows between that inner wall and the interior wall of outer fairing 19 serving as the outer fan duct wall. Further shown is a turbine, 22, that provides the torque for rotating fan 21 with both being shown symmetrically positioned with respect to an engine end cone, 23, behind which in this view is the mechanical interconnection apparatus connecting turbine 22 to fan 21 to allow this fan to be rotated thereby as can be seen in FIG. 1C.

Further shown in FIG. 1B, in addition to heat exchanger 14, is the additional large drag and large cooling rates heat exchanger, 24, to be selectively used in more extreme cooling load conditions to provide further cooling of the lubricating oil in addition to cooling of that oil provided by exchanger 14. A plurality of oil carrying tubes, 25, that are suitably connected into the lubrication system so as to allow oil therein to flow through these tubes are provided in a selectively moveable core, 26, in heat exchanger 24. Heat exchanger 24 is mounted on the engine side of an upper portion of nacelle wall 18 as is also seen in FIGS. 1B and 1C. There is provided an opening in wall 18 so that air cooled core 26 in exchanger 24 can be extended through this opening into, and retracted from, fan steam 13 to the degree selected to thereby vary the oil cooling rate based on the various oil cooling conditions encountered in operating turbofan engine 20.

Heat exchanger 24 is of a kind further described in a copending U.S. patent application entitled "Air-Oil Heat Exchanger" having Ser. No. 11/378,166 filed on Mar. 17, 2006. For example, when heat exchanger 24 is of a kind described in the '166 application, it can include moveable core portion 26 which is forced into airstream 13. In the example shown in FIG. 1B, moveable core 26 can be actuated such that it is deployed and retracted to varying degrees through opening 27 in inner duct wall 18. As such, cover 28 can be shaped to shield heat exchanger 24 to reduce drag when moveable core 26 is retracted from turbofan airstream 13. Heat exchanger 24 need not be of this kind, however, and could instead, as one possible alternative, be a heat exchanger similar to heat exchanger 14 but provided elsewhere such as in the fan duct upper bifurcation structure using exit flaps again to vary the cooling rate. Alternatively, a flap could be provided at the duct inlet to reduce or stop air flow into the duct. Similarly, heat exchanger 14 need not be configured as shown but instead could be like heat exchanger 24 as one possible alternative but mounted elsewhere that also permits the core thereof to be extended into fan stream 13.

Figure 2:
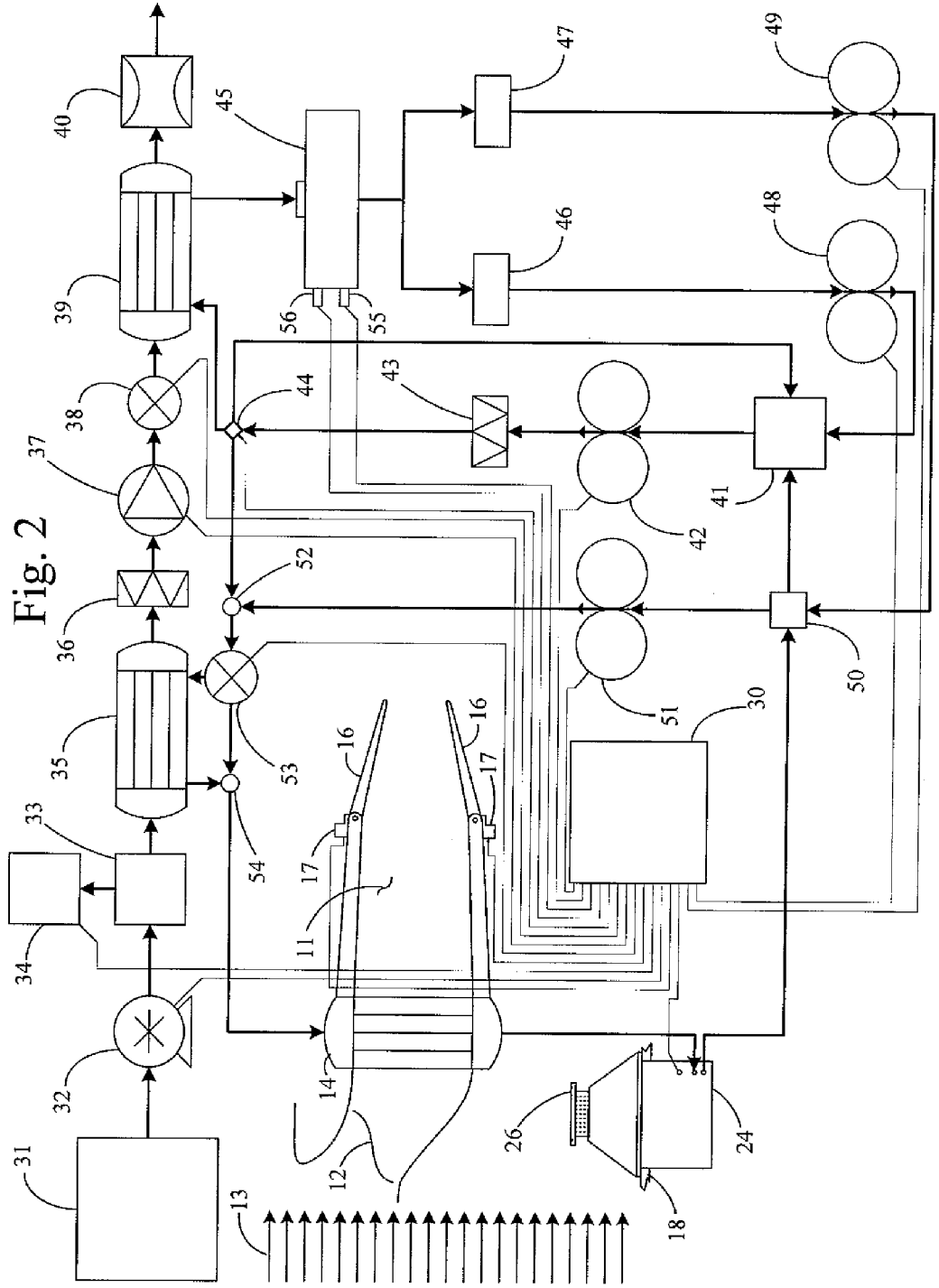
FIG. 2 shows a schematic representation of a typical working fluid system embodying the present invention.

FIG. 2 shows a schematic representation of a typical fuel supply system, and of a typical lubrication system for a geared turbine based engine in which the lubricating oil is, first, typically cooled by the engine fuel in fuel cooled heat exchangers but then selectively further cooled by air through use of air cooled heat exchangers 14 and 24. The systems are operated and controlled by a suitable computer means, 30. Lines extend from computer 30 to the components in the systems directly controlled by that computer and to sensors directly supplying sensed variable information to that computer.

Although not shown, the systems of FIG. 2 used in an aircraft turbofan engine are typically accompanied by a somewhat parallel and separate lubrication system provided for an integrated drive generator that is mechanically powered by the turbofan engine, the generator being used to generate electrical power for the aircraft. After lubricating the generator, the lubricating oil is air cooled by use of an air cooled heat exchanger and also cooled by the turbofan engine fuel in a fuel cooled heat exchanger. Here, too, the use of plural air cooled heat exchangers leads to a more optimal generator lubrication system configuration for air cooling of the lubricating oil, one of them again being optimized for the regularly encountered range of cooling loads and the other for aiding the first exchanger on those relatively few occasions when relatively extreme cooling load conditions are encountered. This generator lubrication system will not be more fully described here because of the similarity between it and the lubrication system being described for the turbofan engine making such a description substantially redundant.

First in FIG. 2, a simplified but representative fuel supply system is schematically shown extending from left to right more or less as a row of interconnected components across the top portion of that figure. There are many alternative variations available for use with respect to this system, and many system details are omitted here for purposes of clarity and for lack of relevance to the present invention. An aircraft fuel tank, 31, has fuel drawn therefrom by a computer controlled aircraft pump, 32, from where it is forced under pressure to a fuel stabilization unit, 33, that uses a motor operated vacuum pump, 34, to remove oxygen from the fuel through a suitable membrane to thereby prevent formation of varnishes in the combustion chamber fuel nozzles that occur because of the use of fuel provided at higher fuel temperatures. The fuel then enters a fuel cooled heat exchanger, 35, used to cool the lubricating oil also supplied thereto as is described below, and to heat the fuel. This fuel, first heated in exchanger 35, is then passed through a fuel filter, 36.

A computer controlled turbofan engine vapor core pump, 37, draws fuel from filter 36 forcing it at very high pressure through a computer controlled main pump valve, 38, and then through a second fuel cooled heat exchanger, 39, again to further cool the lubricating oil also supplied thereto as is also described below, while again raising the temperature of the fuel significantly to improve the combustion process using that fuel. Finally, the heated, highly pressurized fuel is forced through the combustion chamber burner nozzles, 40, to result in combustion thereof in the engine combustion chamber after mixing with compressed air coming thereto from the engine compressors. The resulting gases from such combustion are forced through the engine turbine to turn a turbine shaft couple through a gearbox to the engine compressors.

Below this last described top "row" of interconnected fuel system components for the aircraft turbofan engine is schematically shown a simplified, but representative, oil lubrication system for that geared turbofan engine. Again, there are many alternative variations available for use with respect to this system, and many system details are omitted here for purposes of clarity and for lack of relevance to the present invention.

A main oil tank, 41, has oil drawn therefrom by a pump, 42, that forces the oil under pressure first through an oil filter, 43, en route to a computer controlled diverter valve arrangement, 44. This valve arrangement permits computer 30 to direct a selected fraction of the oil entering this valve arrangement to flow through fuel cooled heat exchanger 39 and the remaining fraction to flow through fuel cooled heat exchanger 35 to thereby a) distribute the heat that is to be rejected from the oil to heat the fuel at more than one location in the fuel supply system so that the fuel heating rate can be limited at those locations to result in preventing problems with other components of that fuel supply system, and b) upon the fuel having been heated sufficiently, to permit this remaining fraction, or perhaps all of the lubricating oil in some situations, to pass through the air cooled heat exchangers for further cooling thereof. The oil pumped from tank 41 in this circumstance flows under pressure after filtering through fuel cooled heat exchanger 39 and into an oil manifold, 45, from where it is distributed to lubricate the bearings, gears and seals in a main gearbox, 46, and to lubricate the bearings, gears and seals in a fan drive gearbox, 47. The oil supplied to main gearbox 46 after providing the desired lubrication therein is drawn therefrom by a scavenger oil pump, 48, and forced back to main oil tank 41.

However, the oil supplied to fan drive gearbox 47 after providing the desired lubrication therein is drawn therefrom by another scavenger oil pump, 49, and forced back instead to an emergency oil tank, 50. This permits computer 30 to direct operation of a secondary oil lubrication system in the event of an engine shutdown during flight to keep the bearings, gears and seals in fan drive gearbox 47 lubricated in such a circumstance as the compressors of the engine continue to rotate. In this secondary lubrication system, a pump, 51, forces the oil under pressure to a combiner arrangement, 52, where this oil is combined with that fraction of oil supplied from main pump 42 that is directed by computer 30 to be further cooled by the remaining heat exchangers in the lubrication system.

The oil flows from these two sources, tanks 41 and 50, that are combined in combiner arrangement 52 goes under pressure to a computer controlled bypass valve, 53, by which computer 30 can direct a selected fraction of this combined oil flow to be forced through fuel cooled heat exchanger 35 to further heat the fuel and further cool that fraction of the oil provided thereto. The oil flow fraction in exchanger 35, if any, is recombined with any of the oil from combiner arrangement 52 not directed through that exchanger in a further combiner arrangement, 54, with the combined oil therefrom forced under pressure through oil carrying tubes 15 (not explicitly shown in FIG. 2) of air cooled heat exchanger 14, this exchanger having been described above in connection with FIGS. 1A and 1C. The degree of air cooling of the oil flowing through exchanger 14 is, as indicated above, controlled by the exit area of duct 11 through which any portion of airstream 13 in duct 11 must pass as set by the opening between flaps 16 selected by computer 30 through appropriately operating motors/sensors 17.

The oil emerging from heat exchanger 14 is subject to a further opportunity of being air cooled in being forced under pressure to enter oil carrying tubes 25 (not explicitly shown in FIG. 2) in moveable core 26 of computer controlled, air cooled heat exchanger 24. This heat exchanger has been described above in connection with FIGS. 1B and 1C with the exception of stating further there that a position sensor is also provided therewith to sense the distance of extension of core 26 into airstream 13. The degree of air cooling of the oil flowing through exchanger 24 is, as indicated above, controlled by the degree of extension selected by computer 30 of moveable core 26 into airstream 13 through inner duct wall 18. The oil emerging from exchanger 24 is then returned to emergency oil tank 50 with any inflows of the oil that accumulate beyond the capacity of tank 50 being overflowed into main tank 41.

Computer 30 is aided in providing operating directions for the lubrication system of FIG. 2 by receiving sensed data concerning certain of the parameters of that system. Thus, as has already been indicated, computer 30 receives from motors/sensors 17 the angular position data regarding the positions of duct exit flaps 16, $\theta_{flap}$. In addition, computer 30, among other data received thereby, receives the lubrication oil temperature, $T_{cur}$, from a temperature sensor, 55, provided in manifold 45. Similarly, computer 30 receives the lubrication oil pressure from a pressure sensor, 56, also in manifold 45.

Generally, the lubrication system of FIG. 2, as an example lubrication system insofar as being presented for a geared fan turbofan engine (although other kinds of turbine engines with appropriate lubrication systems could have been alternatively used), is operated on the basis of keeping the current temperature of the lubricating oil therein within a selected temperature range while a) using the excess heat to be rejected therefrom to preheat the aircraft fuel but only to temperatures less than a maximum of about 300° F. to thereby preclude formation of deposits in the fuel supply system tubing, and b) dissipating any further excess rejected heat into the passing fan airstream through plural contingently operated air cooled heat exchangers. Thus, the allowable temperature range for the lubricating oil in the lubrication system is determined, and the cooling rate of the oil so as to remain in that range is controlled by first having any of the excess heat generated in that oil during engine operation in the current engine operating conditions being transferred to the engine fuel to the extent determined needed in heating that fuel to desired temperatures therefor. This is accomplished in one or more fuel cooled heat exchangers carrying the lubricating oil therethrough. This is all that needs to be done with the lubricating oil if the fuel temperature and the fuel flow rate allow sufficient cooling of that oil.

If the fuel cannot sufficiently absorb the heat generated in the oil during engine operation in the current engine operating conditions to maintain the lubricating oil in the allowed temperature range therefor, the oil in passing through air cooled heat exchangers 14 and 24 is further cooled by the fan airstream first by opening the thrust producing, variably separated, exit flaps 16 forming an exit nozzle to an appropriate degree. If the combined cooling provided by the fuel cooled heat exchanges and heat exchanger 14 with flaps 16 fully separated is insufficient to have the fuel and fan airstream absorb the heat generated in the oil during engine operation in the current engine operating conditions, such as may happen in conditions of the fuel and air being relatively hot and the fan airstream flow rate being relatively low, the oil is then further cooled by extending moveable core 26 into fan airstream 13 to an appropriate degree.

Once conditions change after some or all of these measures for added cooling of the oil have been undertaken, the oil temperature may reduce sufficiently to risk dropping below the allowed range therefor. Then the degree of extension of moveable core 26 in heat exchanger 24 is reduced to an appropriate degree. If the reduced cooling resulting from core 26 being fully retracted is insufficient to keep enough heat in the oil to keep it in the allowed temperature range therefor, flaps 16 controlling the portion of fan airstream 13 that flows through heat exchanger 14 are brought together to an appropriate degree to reduce the fraction of airstream 13 flowing therethrough. The appropriate degrees in the foregoing are set by computer 30 using data or algorithms made available thereto, and the determinations of the measures to be taken over time are based on computer 30 repeatedly checking on the status of the system over time in cycles during which determinations are made as to whether redirection of the current system deployment is needed.

There are many alternatives to provide operation of the turbine engine lubrication systems with fuel cooled oil heat exchangers and variable rate air cooled oil heat exchangers to keep the current lubricating oil temperatures therein within the allowed temperature range therefor in the general manner just described for doing so. One representative method for operating the air cooled heat exchangers in the system shown in FIG. 2 is indicated in FIG. 3 showing a flow chart to be used by a suitable, well known type of computer serving as computer 30 in providing directions for such aspects of the lubrication system operation. These directions based on this chart will be just a subset of the directions provided by this computer in operating the system of FIG. 2 and other systems used in connection with the corresponding turbofan engine.

Figure 3A:
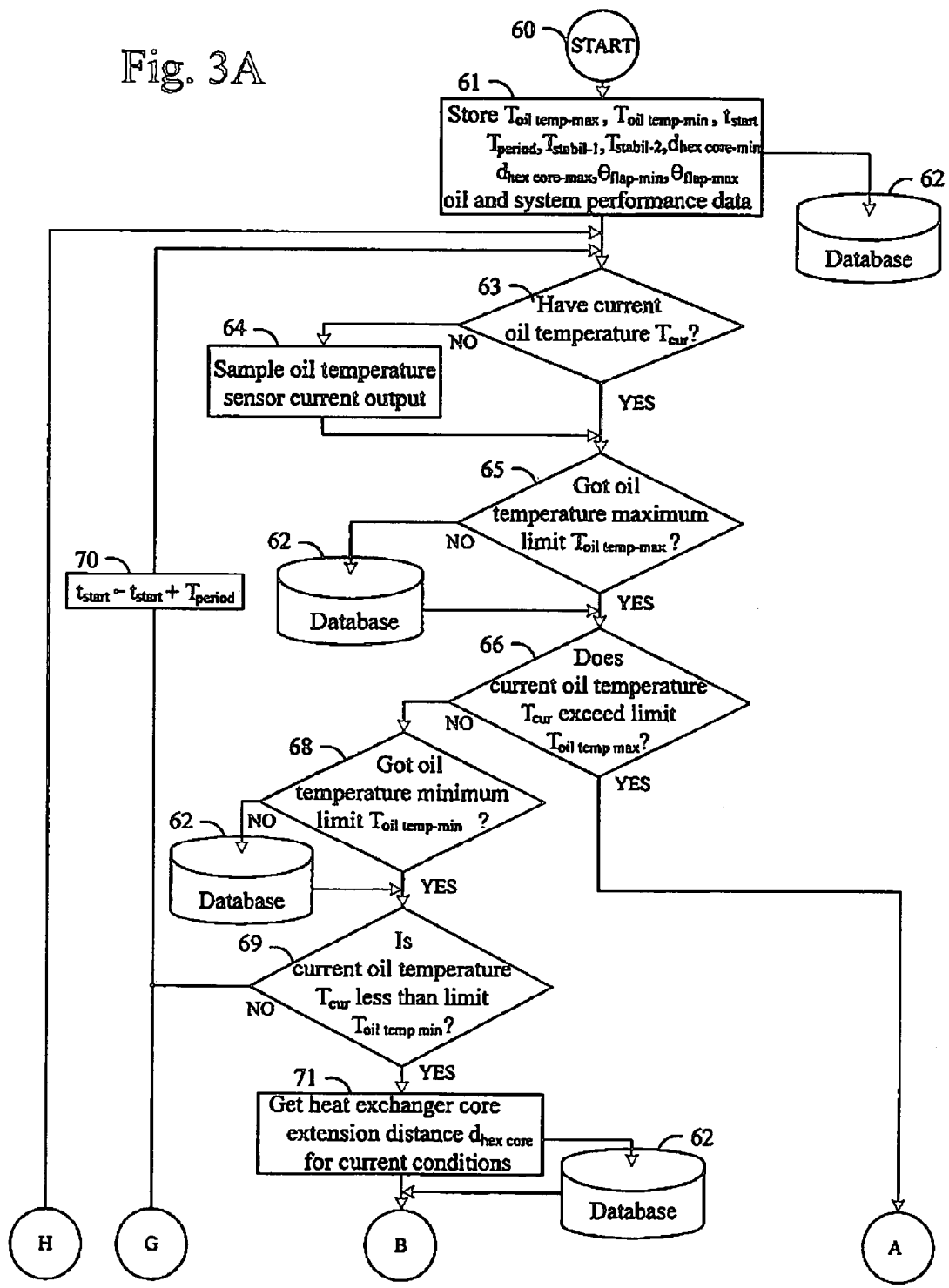
Figure 3C:
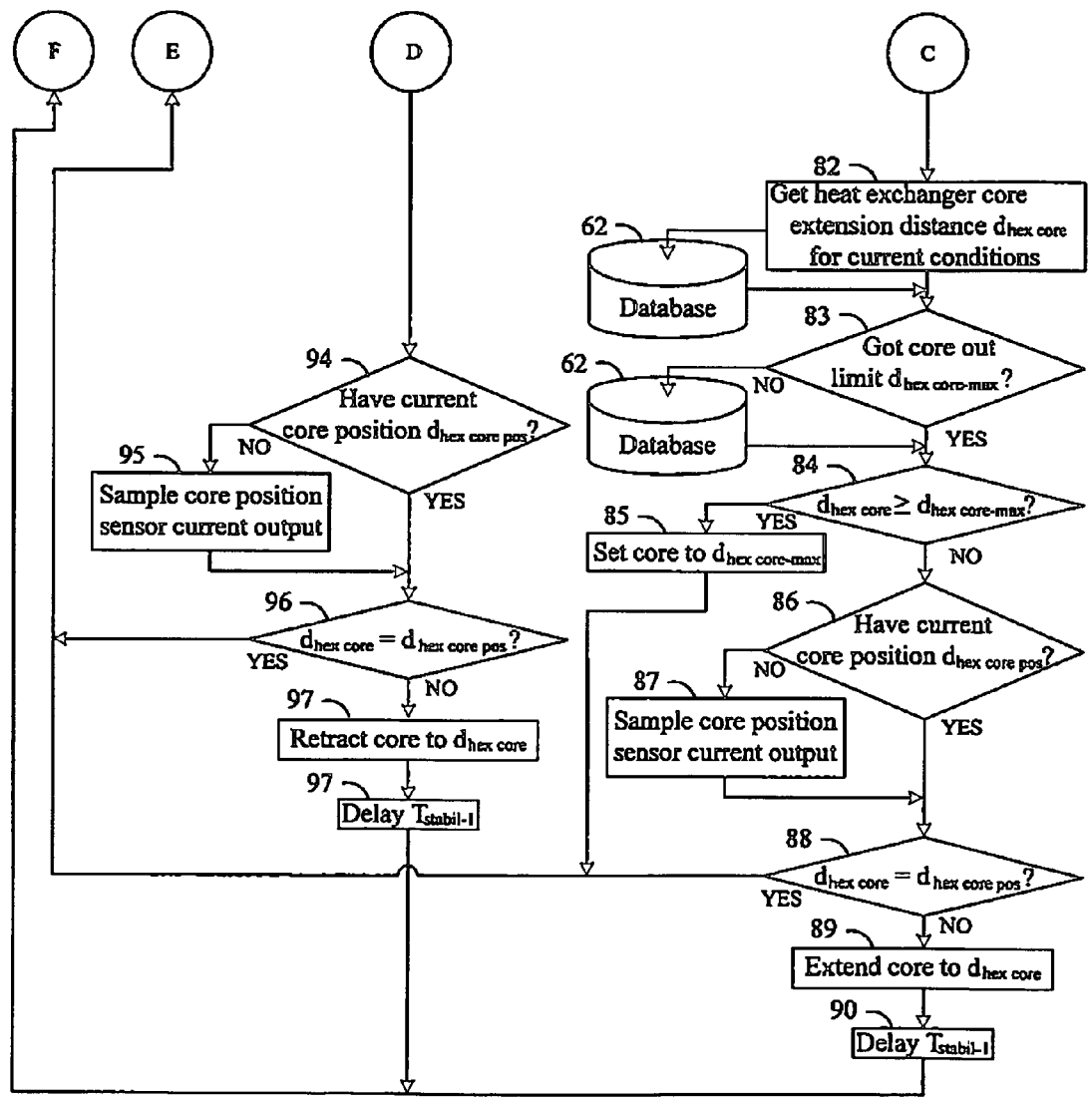

The start of the lubrication system operation at a start balloon, 60, in FIG. 3A requires the previous or current storing of pertinent data and events, as indicated in an action block, 61, where such storage is provided in a database, 62, of some sort. Typically, there will be a variety of well known data and event storage means in the system which need not be further described, and are all considered as part of database 62 which number will be repeatedly used to designate database symbols used elsewhere in the chart. Indicated being stored in box 61 is the desired operating temperature range for the current oil temperature $T_{cur}$ set by the endpoints of that range, $T_{oil\ tem-max}$ and $T_{oil\ temp-min}$. The event time $t_{start}$ is also stored, as is the computer rechecking and redetermination cycle time period, $T_{period}$, and the system stabilization time periods, $T_{stabil-1}$ and $T_{stabil-2}$. In addition, there is also stored the extension range for moveable core 26 of heat exchanger 24 as indicated to be set by range endpoints $d_{hex\ core-min}$ and $d_{hex\ core-max}$, and the angular range for exit flaps 16 as indicated to be set by $\theta_{flap-min}$ and $\theta_{flap-max}$. Beyond these, box 61 indicates that there generally will be other related system data stored in database 62 such as parameters for the kind of lubricating oil used and system performance data useful for determining systems emergency conditions, systems maintenance and the like.

Following the start of system operation at $t_{start}$, computer 30 begins an oil temperature status check and possible system deployment redetermination cycle by going to a decision diamond, 63, which leads to the action taken in an action box, 64, in getting the current system lubrication oil temperature $T_{cur}$ from temperature sensor 55 in manifold 45 and returning it to computer 30. Computer 30 then goes to a further decision diamond, 65, which leads to retrieving from database 62 the lubricating oil upper limit $T_{oil\ temp-max}$ and returning it to computer 30.

Computer 30 is then ready to determine at a further decision diamond, 66, whether the current oil temperature exceeds the desired upper temperature limit or not. If so, computer 30 goes through matching balloons designated "A" in FIGS. 3A and 3B to a further action box, 67, leading to retrieving from data, or from an algorithm, stored in database 62 the angles of exit flaps $\theta_{flap}$ suited for current oil temperature conditions and returning it to computer 30.

If the current oil temperature does not exceed the desired upper temperature limit, computer 30 goes to a different decision diamond, 68, which leads to retrieving from database 62 the desired lubricating oil lower limit $T_{oil\ temp-min}$ and returning it to computer 30. Computer 30 is then ready to determine at a further decision diamond, 69, whether the current oil temperature is less than the desired lower temperature limit or not. If not, the current oil temperature is within the desired temperature range and computer 30 goes to a return action box, 70, to pause for the recheck period $T_{period}$ before beginning another oil temperature status recheck and possible system deployment redetermination cycle. If the current oil temperature is below the desired lower temperature limit, however, computer 30 goes to a further action box, 71, leading to retrieving from data, or from an algorithm, stored in database 62 the distance $d_{hex\ core}$ for moveable core 26 to be extended into airstream 13 suited for current oil temperature conditions and returning it to computer 30.

In the situation in which the current oil temperature exceeds the desired upper temperature limit and the angles of exit flaps $\theta_{flap}$ suited for current oil temperature conditions has been returned to computer 30 in action box 67, the limit on the angle of exit flaps 16 to be maximally open $\theta_{flap-max}$ is retrieved by computer 30 from database 62 in a further decision diamond, 72. Computer 30 in a succeeding decision diamond, 73, then determines if the suitable exit flaps 16 angle for the current conditions $\theta_{flap}$ was found to be equal to this limit in the previous adjustment of the exit flaps angle in a previous cycle. If not, computer 30 thereby determines that more cooling can be obtained from heat exchanger 14. Computer 30 then goes from decision diamond 73 to a succeeding decision diamond, 74. There computer 30 determines whether the desired exit flaps 16 angle $\theta_{flap}$ is equal to or greater than this limit. If it is, computer 30 alters the exit flaps 16 angle with respect to airstream 13 to open them to the limit $\theta_{flap-max}$ in a further action box, 75, and computer 30, following a system stabilization delay, $T_{stabil-2}$, set in another action box, 76, then goes through matching balloons designated "H" in FIGS. 3A and 3B to begin the next oil temperature status recheck and possible system deployment redetermination cycle.

If, alternatively, the desired exit flaps 16 angle $\theta_{flap}$ is determined to be less than the limit $\theta_{flap-max}$ in decision diamond 74, heat exchanger 14 is to be adjusted to provide the desired cooling corresponding to desired exit flaps 16 angle $\theta_{flap}$ either acting to begin providing the maximum cooling it can provide or providing something less than this maximum. Computer 30 goes to a further decision diamond, 77, which leads to the action taken in an action box, 78, in getting the current exit flaps 16 angle, $\theta_{flap\ pos}$, from motors/sensors 17 and returning it to computer 30. In a succeeding decision diamond, 79, computer 30 determines if exit flaps 16 are currently positioned at the desired exit flaps 16 angle $\theta_{flap}$ or not. If so, computer 30 then goes through matching balloons designated "H" in FIGS. 3A and 3B to begin the next oil temperature status recheck and possible system deployment redetermination cycle. If, however, exit flaps 16 are not currently positioned at the desired exit flaps 16 angle $\theta_{flap}$, computer 30 in a further action box, 80, adjusts the angular position of exit flaps 16 to equal the desired angle value $\theta_{flap}$, and following a system stabilization delay, $T_{stabil-1}$, set in another action box, 81, returns through matching balloons designated "H" in FIGS. 3A and 3B to begin the next oil temperature status recheck and possible system deployment redetermination cycle.

If the heating being provided to the lubricating oil by the operation of the turbofan engine continues to keep the current oil temperature above the desired maximum temperature $T_{oil\ temp-max}$, successive status recheck and possible system deployment redetermination cycles will lead to computer 30 obtaining updated values for the desired exit flaps 16 angle $\theta_{flap}$ for heat exchanger 14 that keep getting larger. As a result, computer 30 forces the angular position of exit flaps 66 toward their maximum open position $\theta_{flap-max}$. Thus, in some status recheck and possible system deployment redetermination cycle, computer 30 in decision diamond 73 will come to the determination that the suitable exit flaps 16 angle for the current conditions $\theta_{flap}$ was set equal to the limit $\theta_{flap-max}$ in the previous adjustment of the exit flaps 16 angle in a previous cycle. Thereby, computer 30 determines that nothing more in the way of added cooling can be obtained from adjusting the angle of exit flaps 16.

Hence, heat exchanger 24 must be additionally employed by deploying moveable core 26 thereof. Thus, computer 30, rather than going to decision diamond 74, goes through matching balloons designated "C" in FIGS. 3B and 3C to a further action box, 82. This leads to retrieving from data, or from an algorithm, stored in database 62 the distance $d_{hex\ core}$ for moveable core 26 to be extended into airstream 13 suited for current oil temperature conditions and returning it to computer 30.

Then the limit on the extending of core 26 in being maximally extended, $d_{hex\ core-max}$, is retrieved by computer 30 from database 62 in a further decision diamond, 83, and computer 30 in a succeeding decision diamond, 84, then determines whether the desired core extension distance $d_{hex\ core}$ is less than this limit. If not, computer 30 extends core 26 of heat exchanger 24 into airstream 13 to the limit $d_{hex\ core-max}$ in a further action box, 85, and computer 30 then goes through matching balloons designated "E" in FIGS. 3B and 3C, and through matching balloons designated "G" in FIGS. 3A and 3B, to return action box 70 to pause for the recheck period $T_{period}$ before beginning another oil temperature status recheck and possible system deployment redetermination cycle.

If, alternatively, the desired core extension distance $d_{hex\ core}$ is determined to be less than the limit $d_{hex\ core-max}$ in decision diamond 84, heat exchanger 24 is to be adjusted to provide the desired cooling corresponding to desired exit flaps 16 angle $\theta_{flap}$ either acting to begin providing the maximum cooling it can provide or providing something less than this maximum. Computer 30 goes to a further decision diamond, 86, which leads to the action taken in an action box, 87, in getting the current extension position, $d_{hex\ core\ pos}$, from heat exchanger 24 of its moveable core 26 and returning it to computer 30. In a succeeding decision diamond, 88, computer 30 determines if core 26 of heat exchanger 24 is currently positioned at the desired core extension distance $d_{hex\ core}$ or not. If so, computer 30 then goes through matching balloons designated "E" in FIGS. 3B and 3C, and through matching balloons designated "G" in FIGS. 3A and 3B, to return action box 70 to pause for the recheck period $T_{period}$ before beginning another oil temperature status recheck and possible system deployment redetermination cycle. If, however, core 26 of heat exchanger 24 is not currently positioned at the desired core extension distance $d_{hex\ core}$, computer 30 in a further action box, 89, adjusts the extension position of core 26 to equal the desired extension value $d_{hex\ core}$. Following a system stabilization delay, $T_{stabl-1}$, set in another action box, 90, computer 30 returns through matching balloons designated "F" in FIGS. 3B and 3C, and through matching balloons designated "H" in FIGS. 3A and 3B, to begin the next oil temperature status recheck and possible system deployment redetermination cycle.

When, as a result of the additional cooling of the system lubricating oil provided by air cooled heat exchangers 14 and 24 operated as above leads to the oil being cooled to a temperature that is less than the desired minimum temperature $T_{oil\ temp\text{-}min}$, computer 30 determines that it must then reduce the cooling provided by those heat exchangers starting with heat exchanger 24. In this situation in which the current oil temperature $T_{cur}$ is less than the desired lower temperature limit and the distance $d_{hex\ core}$ for moveable core 26 of heat exchanger 24 to be extended into airstream 13 suited for current oil temperature conditions has been returned to computer 30 in action box 71, computer 30 first determines whether core 26 in these conditions should be deployed at all.

In accomplishing this, computer 30 goes through matching balloons designated "B" in FIGS. 3A and 3B to a decision diamond, 91, that leads to retrieving the minimum extension position limit $d_{hex\ core\text{-}min}$ of moveable core 26 of heat exchanger 24 from database 62. Computer 30 then determines in a further decision diamond, 92, whether the desired extension distance $d_{hex\ core}$ for moveable core 26 in the current conditions exceeds its undeployed value of $d_{hex\ core\text{-}min}$. If not, computer 30 retracts core 26 in heat exchanger 24 to its minimum undeployed position of $d_{hex\ core\text{-}min}$ in a further action box, 93, so that no further cooling is provided at that point by heat exchanger 24. If, however, computer 30 determines at decision diamond 92 that the desired distance $d_{hex\ core}$ for moveable core 26 in the current conditions exceeds its undeployed value of $d_{hex\ core\text{-}min}$, then further cooling is to be provided by heat exchanger 24. Computer 30 goes as a result goes through matching balloons designated "E" in FIGS. 3B and 3C to a decision diamond, 94, to determine if any adjustment is required in the amount of this further cooling that is to be provided by heat exchanger 24.

Computer 30 going to decision diamond 94 leads to the action taken in an action box, 95, of getting the current extension position, $d_{hex\ core\ pos}$, from heat exchanger 24 of its moveable core 26 and returning it to computer 30. In a succeeding decision diamond, 96, computer 30 determines if core 26 of heat exchanger 24 is currently positioned at the desired core extension distance $d_{hex\ core}$ or not. If so, computer 30 then goes through matching balloons designated "E" in FIGS. 3B and 3C, and through matching balloons designated "G" in FIGS. 3A and 3B, to return action box 70 to pause for the recheck period $T_{period}$ before beginning another oil temperature status recheck and possible system deployment redetermination cycle. If, however, core 26 of heat exchanger 24 is not currently positioned at the desired core extension distance $d_{hex\ core}$, computer 30 in a further action box, 97, adjusts the extension position of core 26 to equal the desired extension value $d_{hex\ core}$. Following a system stabilization delay, $T_{stabil\text{-}1}$, set in another action box, 97, computer 30 returns through matching balloons designated "F" in FIGS. 3B and 3C, and through matching balloons designated "H" in FIGS. 3A and 3B, to begin the next oil temperature status recheck and possible system deployment redetermination cycle.

If the cooling being provided to the lubricating oil by air cooled heat exchangers 14 and 24 continues to keep the current oil temperature below the desired minimum temperature $T_{oil\ temp\text{-}min}$, successive status recheck and possible system deployment redetermination cycles will lead to computer 30 to obtaining updated values for the desired extension distance $d_{hex\ core}$ for moveable core 26 of heat exchanger 24 that keep getting smaller. As a result, computer 30 forces the extension position of moveable core 26 toward its minimum $d_{hex\ core\text{-}min}$ so that in some cycle the determination in decision diamond 92 results in the action of action box 93 of setting the extension position of moveable core 26 to that minimum.

Hence, any further reduction in the cooling of the oil by the air cooled heat exchangers must then occur through sufficiently closing exit flaps 16 to reduce the cooling provided by heat exchanger 14. Thus, computer 30, rather than going to decision diamond 94 from decision diamond 92 and after setting the extension position of moveable core 26 to $d_{hex\ core\text{-}min}$ in action box 93, goes to a further action box, 98. This leads to retrieving from data, or from an algorithm stored in database 62 the desired exit flaps 16 angle $\theta_{flap}$ for heat exchanger 14 suited for current oil temperature conditions and returning it to computer 30.

Then the limit on the closing the exit flaps 16 angle $\theta_{flap}$ in being minimally open, $\theta_{flap\text{-}min}$, is retrieved by computer 30 from database 62 in a further decision diamond, 99. Computer 30 in a succeeding decision diamond, 100, then determines whether the desired exit flaps 16 angle $\theta_{flap}$ is greater than this limit to determine if heat exchanger 14 is to be adjusted to provide the desired cooling corresponding to desired exit flaps 16 angle $\theta_{flap}$ either acting to begin providing the maximum cooling it can provide or providing something less than this maximum. If the desired exit flaps 16 angle $\theta_{flap}$ is not greater than this limit, computer 30 close exit flaps 16 of heat exchanger 14 against the portion of airstream 13 passing through that heat exchanger to the limit $\theta_{flap\text{-}min}$ in a further action box, 101. Following a system stabilization delay, $T_{stabil\text{-}2}$, set in another action box, 102, computer 30 returns through matching balloons designated "H" in FIGS. 3A and 3B to begin the next oil temperature status recheck and possible system deployment redetermination cycle.

If, alternatively, the desired exit flaps 16 angle $\theta_{flap}$ is determined to be greater than the limit $\theta_{flap\text{-}min}$ in decision diamond 100, computer 30 goes to a further decision diamond, 103, which leads to the action taken in an action box, 104, in getting the current exit flaps 16 angle position, $\theta_{flap\ pos}$, from motors/sensors 17 and returning it to computer 30. In a succeeding decision diamond, 105, computer 30 determines if core 26 of heat exchanger 24 is currently positioned at the desired exit flaps 16 angle $\theta_{flap}$ or not. If so, computer 30 then goes through matching balloons designated "G" in FIGS. 3A and 3B, to return action box 70 to pause for the recheck period $T_{period}$ before beginning another oil temperature status recheck and possible system deployment redetermination cycle. If, however, exit flaps 16 of heat exchanger 14 are not currently positioned at the desired exit flaps 16 angle $\theta_{flap}$, computer 30 in a further action box, 106, adjusts the angular position of exit flaps 16 to equal the desired exit flaps 16 angle $\theta_{flap}$. Following a system stabilization delay, $T_{stabil\text{-}1}$, set in another action box, 107, computer 30 returns through matching balloons designated "H" in FIGS. 3A and 3B to begin the next oil temperature status recheck and possible system deployment redetermination cycle.

Although the present invention has been described with reference to preferred embodiments, workers skilled in the art will recognize that changes may be made in form and detail without departing from the spirit and scope of the invention.

The invention claimed is:
1. A heat exchange system upstream of a turbofan bypass airstream nozzle to cool a liquid working fluid in turbofan airstreams, the system comprising:
 a lower bifurcation structure with moveable exit flaps;
 a first heat exchanger mounted stationary in the lower bifurcation structure with a plurality of passageways through which the working fluid can flow to be cooled by the portions of the turbofan airstream in the lower bifurcation structure; and a second heat exchanger with a moveable core with a plurality of passageways through which the working fluid can flow, and an actuator to force the core into portions of the turbofan airstream;

wherein the actuator selectively forces the core into portions of the turbofan airstream by moving the core through an opening in a wall.

2. The heat exchange system of claim 1, wherein the passageways of the first heat exchanger and the second heat exchanger are connected in series.

3. The heat exchange system of claim 1, and further comprising an input and output conduit connecting to the first and second heat exchangers to allow the working fluid to enter and exit the first and second heat exchangers.

4. The heat exchange system of claim 3, and further comprising a sensor to determine temperature of the working fluid prior to the input conduit and determine if a first sensed temperature exceeds a selected maximum temperature.

5. The heat exchange system of claim 4, and further comprising a controller to selectively allow portions of the turbofan airstream to enter the first heat exchanger based on the first sensed temperature by opening or closing the exit flaps.

6. The heat exchange system of claim 1, and further comprising a controller to control the exit flap angles and the actuator.

7. The heat exchange system of claim 6, wherein the controller selectively exposes a portion of the second heat exchanger to the turbofan airstream to regulate the temperature of the working fluid.

8. The heat exchange system of claim 1, wherein the exit flaps are located directly upstream or adjacent to the turbofan bypass airstream nozzle.

9. A heat exchange system using turbofan bypass airstream to cool a working fluid, the system comprising:

a bifurcation structure;

exit flaps to control flow through the bifurcation structure and fan airstream thrust;

a heat exchanger with a first portion mounted stationary in the bifurcation structure and a second portion, each portion including a plurality of passageways about which a portion of the turbofan airstream flowing through the bifurcation structure can flow and through which the working fluid can flow to be cooled by the portion of the turbofan bypass airstream, and with the passageways of the first portion being connected to the passageways of the second portion; and an input and output conduit connecting to the first and second portions of the heat exchanger to allow working fluid to enter and exit the heat exchanger;

wherein the second portion of the heat exchanger includes a core with the plurality of passageways through which the working fluid can flow, a core actuator to selectively deploy and retract the core into portions of the turbofan airstream by moving the core through an opening in a wall, and a shield to cover affixed to the second portion of the heat exchanger, the cover shaped to shield the second portion of the heat exchanger when the core is not forced in retracted from portions of the airstream to reduce drag.

10. The heat exchange system of claim 9, and further comprising:

a first sensor to determine temperature of the working fluid prior to the input conduit and determine if the sensed temperature exceeds a selected maximum temperature; and a first bypass valve connected to the input conduit and to the output conduit to enable shunting at least in part the working fluid to pass around the first and second portions of the heat exchanger based on at least the first sensor.

11. The heat exchange system of claim 10, and further comprising:

a second bypass valve connected to the outlet of the plurality of passageways of the first portion of the heat exchanger and to the output conduit to enable shunting at least in part the working fluid to pass around the second portion of the heat exchanger based on at least the first sensor.

12. The heat exchange system of claim 11, and further comprising a controller to selectively allow portions of the turbofan bypass airstream to enter the first portion of the heat exchanger based on the temperature sensed and to control the exit flap angles.

13. The heat exchange system of claim 12, wherein the controller selectively allows a portion of the working fluid to flow from the first portion of the heat exchanger to the second portion of the heat exchanger based on the temperature sensed from the second sensor.

\* \* \* \* \*

UNITED STATES PATENT AND TRADEMARK OFFICE
CERTIFICATE OF CORRECTION

| | | |
|---|---|---|
| PATENT NO. | : 8,776,952 B2 | Page 1 of 1 |
| APPLICATION NO. | : 11/432111 | |
| DATED | : July 15, 2014 | |
| INVENTOR(S) | : Frederick M. Schwarz and Mikhail B. Gorbounov | |

It is certified that error appears in the above-identified patent and that said Letters Patent is hereby corrected as shown below:

In the Specification

Col. 2, Line 28
  Delete "airstream is"
  Insert -- airstreams --

Signed and Sealed this
Eleventh Day of November, 2014

Michelle K. Lee
*Deputy Director of the United States Patent and Trademark Office*